United States Patent
De Catheu et al.

(10) Patent No.: US 12,476,890 B2
(45) Date of Patent: Nov. 18, 2025

(54) INCOMPLETE MATRIX PROFILE-BASED ANOMALY DETECTION IN TIME SERIES DATA

(71) Applicant: StarTree, Inc., Mountain View, CA (US)

(72) Inventors: Cyril De Catheu, Paris (FR); Madhumita Mantri, Sunnyvale, CA (US); Suvodeep Pyne, Sunnyvale, CA (US)

(73) Assignee: StarTree, Inc., Mountain View, CA (US)

( * ) Notice: Subject to any disclaimer, the term of this patent is extended or adjusted under 35 U.S.C. 154(b) by 106 days.

(21) Appl. No.: 18/474,904

(22) Filed: Sep. 26, 2023

(65) Prior Publication Data

US 2025/0106131 A1    Mar. 27, 2025

(51) Int. Cl.
| | |
|---|---|
| G06F 7/00 | (2006.01) |
| H04L 41/0604 | (2022.01) |
| H04L 43/045 | (2022.01) |
| H04L 43/067 | (2022.01) |

(52) U.S. Cl.
CPC ........ H04L 43/067 (2013.01); H04L 41/0627 (2013.01); H04L 43/045 (2013.01)

(58) Field of Classification Search
CPC . H04L 43/067; H04L 41/0627; H04L 43/045; G06F 16/2322; G06F 16/489; G06F 16/686; G06F 16/7867
See application file for complete search history.

(56) References Cited

U.S. PATENT DOCUMENTS

| | | | | |
|---|---|---|---|---|
| 9,516,053 | B1* | 12/2016 | Muddu | G06F 16/9024 |
| 10,200,262 | B1* | 2/2019 | Leverich | H04L 63/1425 |
| 12,158,880 | B1* | 12/2024 | Curtis | G06F 16/242 |
| 2010/0063773 | A1* | 3/2010 | Marvasti | G05B 23/0221 |
| | | | | 702/179 |
| 2012/0137367 | A1* | 5/2012 | Dupont | G06F 21/00 |
| | | | | 726/25 |
| 2019/0129821 | A1* | 5/2019 | Lee | G06F 11/3452 |
| 2019/0370610 | A1* | 12/2019 | Batoukov | G06F 11/0709 |
| 2020/0012791 | A1* | 1/2020 | Kraft | G06F 8/65 |
| 2020/0125433 | A1* | 4/2020 | Leverich | G06F 11/079 |
| 2020/0258157 | A1* | 8/2020 | Law | G06Q 40/04 |
| 2020/0301405 | A1* | 9/2020 | Zhang | G05B 23/0221 |
| 2021/0141900 | A1* | 5/2021 | Brown | G06F 21/57 |
| 2021/0144164 | A1* | 5/2021 | Mathur | H04L 67/10 |
| 2022/0058174 | A1* | 2/2022 | Lemberg | G06F 11/3075 |
| 2023/0327892 | A1* | 10/2023 | Khare | H04L 9/50 |
| | | | | 713/193 |

(Continued)

OTHER PUBLICATIONS

DAMP: accurate time series anomaly detection on trillions of datapoints and ultra-fast arriving data streams Yue Lu, Renjie Wu, Abdullah Mueen, Maria A. Zuluaga, Eamonn Keogh, Jan. 11, 2023 (Year: 2023).*

(Continued)

*Primary Examiner* — Mohammed R Uddin
(74) *Attorney, Agent, or Firm* — Schwegman Lundberg & Woessner, P.A.

(57) ABSTRACT

Various embodiments described herein support or provide for anomaly detection in time series data (e.g., comprising measurement values for a metric of a monitored system) based on one or more incomplete matrix profiles.

20 Claims, 7 Drawing Sheets

(56) References Cited

U.S. PATENT DOCUMENTS

2023/0342371 A1* 10/2023 Nakamura ............. G06F 18/22
2024/0273095 A1*  8/2024 Yeh .................... G06F 16/2465

OTHER PUBLICATIONS

Akbarinia, Reza, "Efficient Matrix Profile Computation Using Different Distance Functions", Computer Science Machine Learning arXiv:1901.05708, (Jan. 17, 2019), 11 pgs.

Yeh, Chin-Chia Michael, "Matrix Profile I: All Pairs Similarity Joins for Time Series: A Unifying View that Includes Motifs, Discords and Shapelets", 2016 IEEE 16th International Conference on Data Mining (ICDM), (2016), 10 pgs.

* cited by examiner

INCOMPLETE MATRIX PROFILE-BASED ANOMALY DETECTION IN TIME SERIES DATA

TECHNICAL FIELD

The present disclosure relates generally to media assets, and, more particularly, various embodiments described herein provide for systems, methods, techniques, instruction sequences, and devices for anomaly detection in time series data (e.g., metric data from a monitored system) based on one or more incomplete matrix profiles.

BACKGROUND

Generally, anomaly detection is the identification of rare items, events, or observations that stand out by differing significantly from the majority of the data. Anomalies can also be referred to as outliers, novelties, deviations, or exceptions.

Anomaly detection is used in many applications, such as fraud detection, online shopping, data quality monitoring, and Internet of Things (IoT). For example, certain analytics systems can be used to analyze data (e.g., time series log data) generated by other systems, such as web servers, video conferencing platforms or high-frequency monitoring systems (e.g., electrocardiogram, industrial applications, and life science applications), and identify operational anomalies that pose an actual or potential issue (e.g., performance, security, or reliability issue) for those systems. In such contexts, the analytics system can be configured to ingest data (e.g., log data), configured to detect various anomalies, and configured to issue alerts (e.g., to a systems administrator) regarding detected anomalies.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
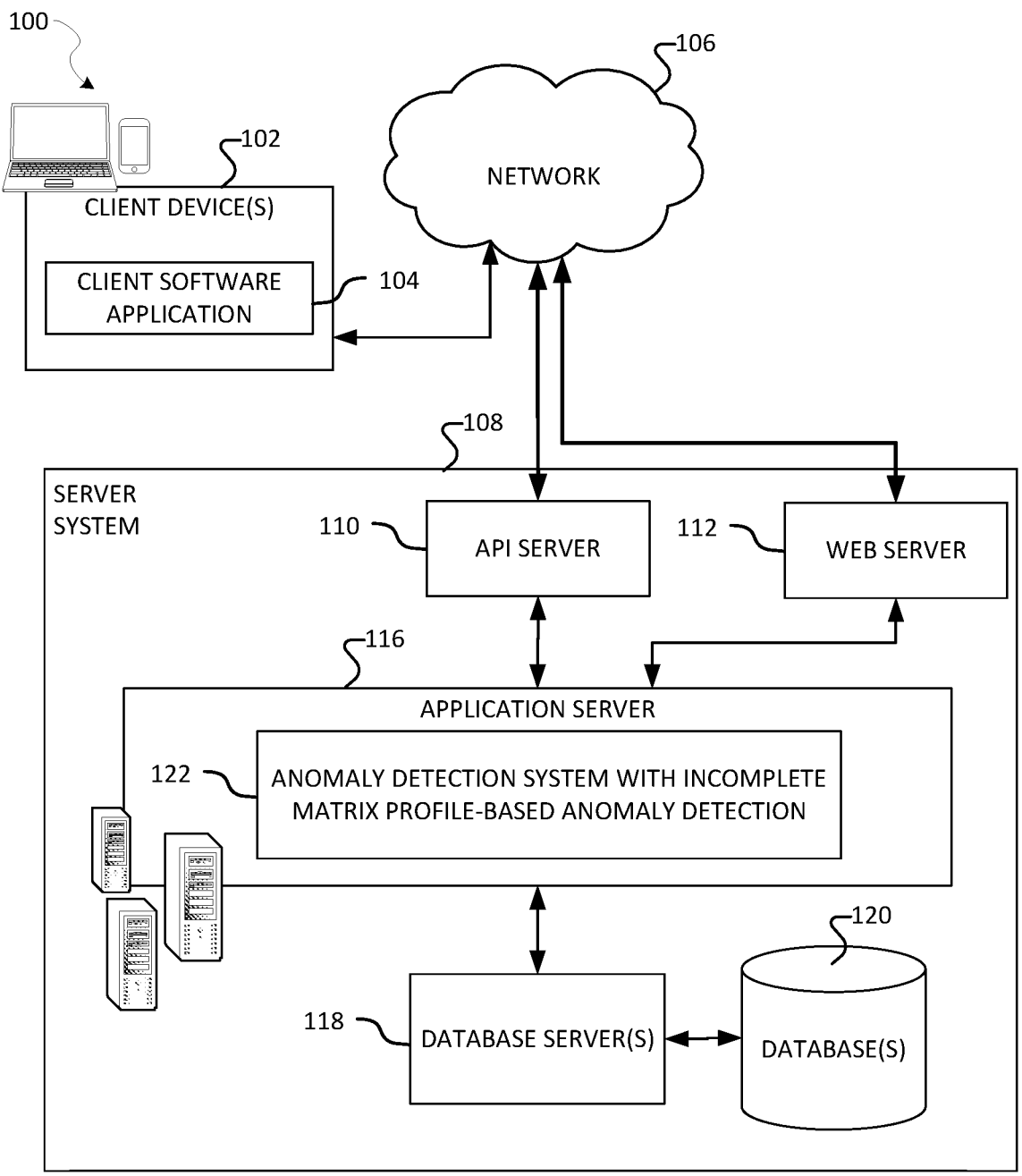
FIG. 1 is a block diagram showing an example data system that includes an anomaly detection system with incomplete matrix profile-based anomaly detection, according to various embodiments of the present disclosure.

When it comes to detecting anomalies in monitored data (e.g., generated or provided by a system or device being monitored for anomalies), Mean Time to Detect (MTTD) can be used to measure how long an anomaly exists before it is detected, on average. The smaller this time is, the more confident one can be that anomalies (e.g., potential) issues will be detected and solved in time. Given that one cannot detect anomalies faster than the detection job frequency, even armed with a perfect anomaly detection model, the MTTD will never reach zero. For instance, if an anomaly detection job is daily, and assuming that an anomaly can happen at any time in the day uniformly and that the detection job runs just after a day is finished (e.g., no ingestion delay), the average delay can be 12 hours, and the maximum delay can be 24 hours.

Traditional anomaly detection technologies are usually batch-based, which means that the anomaly detection methods analyze data that has been collected over a period of time. Detection of anomalies in this manner can take hours or days after a trend occurs to report results. If anything changed between when the batch data was recorded and when the results were generated can render the data and results "stale." This traditional technical solution to detecting anomalies is slow and inefficient, and can lead to outdated insights (e.g., by an analytics system) based on detected anomalies.

To avoid drawbacks of the batch-based approach, different online and real-time anomaly detection approaches have been developed in recent years, one of which includes matrix profiles Conventional matrix profile methods compute multiple matrix profiles as anomaly scores, and if an anomaly score of a select value (e.g., select data point) of a time series is above a certain threshold, the select value is considered an outlier and thus a value anomaly. Conventional matrix profile methods compute the matrix profiles by computing similarities between subsequences of a time series of values. In particular, some conventional matrix profile methods generate a matrix (matrix profile) of all pairwise distances between subsequences of a time series of values, where each distance represents a similarity between subsequences. The smallest distance for each subsequence is extracted to create a vector. A big value in the vector corresponds to a subsequence in the time series that looks like no other, hence something that can be considered anomalous. A transformation can be applied to the matrix profile to return an anomaly score.

Unfortunately, the interactive simulation of conventional matrix profile methods are unable to be fast and accurate on high frequency data when simulating behavior of matrix profile on past data for a given lookback (e.g., available historical data). For conventional methods, this can be computational intensive, with computation time scaling with the number of values of a time series that must be considered (as learning and detection process is run for every value considered by the simulation). For instance, if a user wants to simulate a minute-based anomaly alert for the last 30 days of time series values, the complexity of a matrix profile method could be 30 days*24 hours*60 minutes*complexity of the anomaly detection process for one value in the time series (i.e., 43200*complexity of the anomaly detection process for one value in the time series, for example using conventional matrix profile computation). Generally, the interactive simulation of conventional matrix profile methods do not scale well in terms of speed and accuracy for timeseries granularity smaller than 1 hour. The complexity of a conventional anomaly detection process could be O(n*h*h), with n being the number of points to simulate by a conventional matrix profile method, h being the number of historical points used by the conventional matrix profile method, and h*h being complexity of the conventional matrix profile method. Additionally, usually the more time points of a time series to be simulated by a conventional anomaly detection methodology (e.g., one based on a conventional matrix profile method), the longer the simulation takes to operate (e.g., the simulation typically scales linearly with the number of points to simulate). So even if a given conventional matrix profile methodology performs quickly, a simulation based on the given conventional matrix profile methodology can still become slow when running on many time points of a time series.

Various embodiments described herein cure these and other deficiencies present in conventional art by using an anomaly detection process (e.g., simulated anomaly detection process) based on determining (e.g., generating or computing) incomplete matrix profiles. An anomaly detection process of an embodiment can be used to provide online detection of anomalies (e.g., anomalous values or data point or value) in a time series of values (e.g., generated by and streamed from a monitored system or device) or interactive simulation of performing anomaly detection on historical time series data (e.g., fast simulation even at detecting anomalies at very low granularity, such as minutes, second, and the like). For example, an anomaly detection simulation (e.g., backtracking or time-series cross-validation) can use the anomaly detection process of an embodiment to provide a user with a preview of anomalies detected in historical time series data (e.g., simulate a real-time anomaly detection process, possibly through an web-based graphical user interface) based on one or more anomaly detection configurations (e.g., parameters). One or more anomaly detection configurations previewed can be used by a user to configure and test one or more anomaly detection alerts (e.g., see how configuration or alert rules would behave on live or real-time time series data) before those anomaly detection alerts are enabled for use (e.g., to run them in production, on live or real-time time series data). In this way, a user can quickly preview two or more different anomaly detection configurations, and compare their behavior.

According to various embodiments, anomaly detection process based on determining incomplete matrix profiles comprises determines incomplete matrix profiles (rather than the full matrix profiles) for multiple subsequences in a timer series of values. For some embodiments, the anomaly detection process iterates over a time series of values, and determines incomplete matrix profiles based on a historical lookback parameter (e.g., h). Additionally, for various embodiments, the incomplete matrix profile provides scores (e.g., anomaly scores) for each time point and the scores are used to detect value anomalies in the time series (e.g., incomplete matrix profile scores that surpass an anomaly threshold value) at those time points. For instance, an embodiment can perform the anomaly detection process (e.g., simulate anomaly detection process) by iterating over the time series one time point at a time, and by determining the incomplete matrix profile over only the previous h points (defined by the historical lookback parameter) at each time point. An embodiment can then store a last value of each incomplete matrix profile in a result array (e.g., R) based on the historical lookback parameter (e.g., h). In this way, the result array can comprise a matrix profile score for each time point of the time series. For some embodiments, the scores of the result array represent simulated matrix profile scores (one for each time point of the time series) and represent what the matrix profile would have been at each time point if the time series data was streaming in. Accordingly, performing value anomaly detection based on the result array can represent simulation of detecting value anomalies as if the time series was streaming in. Various embodiments facilitate or enable an anomaly detection preview module, which can perform an exact simulation (e.g., interactive simulation) of an anomaly detection rule (e.g., for an anomaly alert monitor) and which a user can use to quickly see how an anomaly detection rule would behave in real life (e.g., in turn can lead to reconfiguration of the anomaly detection rule).

Depending on the embodiment, the historical lookback parameter can represent a number of previous time points in a time series (corresponding to values in the time series) that are considered when computing the incomplete matrix profile (e.g., left matrix profile) for a current subsequence in the time series. A larger historical lookback parameter can cause an embodiment to consider more previous context (e.g., more values of past/historical time points), while a smaller historical lookback parameter can cause an embodiment to consider less previous context (e.g., less values of past/historical time points).

For some embodiments, each incomplete matrix profile comprises a left matrix profile comprising distances between each individual subsequence (of multiple subsequences in the time series) and the subsequences to the left of the individual subsequence in the time series. In particular, a left matrix profile can comprise distances between each individual subsequence and the subsequences to the left. A method of some embodiments determine (e.g., compute) distances between each individual subsequences and the subsequences to the left that are close enough to the considered subsequence according to a lookback parameter, which corresponds to a historical data limit. The number of subsequences to the left are usually bigger for subsequences at the right of the timeseries. Accordingly, the left matrix profile (of the incomplete matrix profile) can also be referred to as a sliding window left matrix profile or an expanding window left matrix profile. In contrast to left matrix profiles, each full matrix profile comprises all pairwise distances between subsequences in a time series of values.

By determining and using incomplete matrix profiles (e.g., left matrix profiles), the anomaly detection process of some embodiments can (e.g., based on simulation aware logic) avoid or skip determining (e.g., computing) an incomplete matrix profile for a subsequences in a time series of values that extend beyond a historical lookback parameter (e.g., h). Overall, the logic can be used as a masking logic that corresponds to a simulation of the available historical data. With use of incomplete matrix profiles, various embodiments can facilitate (e.g., enable a hardware processor of an analytical system to) detect value anomalies in a time series of values faster and with more efficiency. For instance, a sliding window left matrix profile generated by an embodiment can simulate anomaly detection with a historical data limit in a very fast way, even when monitoring signals (described by timeseries data) at a granularity of 15 minutes to 10 Hz (0.1 seconds).

For some embodiments, incomplete matrix profiles are determined (e.g., by computing z-normalized Euclidean distance measures) using rolling sums and squares of rolling sums. This can enable various embodiment to determine (e.g., generate or compute) incomplete matrix profiles in $O(n)$ time, which can represent an improvement over the complexity (e.g., $O(n^2)$) of conventional methodologies for determining (e.g., generating or computing) matrix profiles.

According to various embodiments, the anomaly detection process described herein can be used to simulate anomaly detection using incomplete matrix profiles, which can be used to provide (e.g., a user) with an interactive simulation for previewing one or more anomaly detection configurations (e.g., parameters), such as those associated with an anomaly alert monitor. For instance, the anomaly detection process based on incomplete matrix profiles can have a complexity of $O((n-h)+h*h)$, where n is the number of points to simulate, h is the number of historical points (historical lookback parameter), and h*h of generating the incomplete matrix profile. For some embodiments, a h to n ratio is $n=12*h$. Additionally, where a user uses 1 month of historical time series data, the user can use anomaly detection process of an embodiment to simulate anomaly detection (e.g., configuration of an anomaly alert monitor in the preview module) on 1 year of time series data. For example, the complexity of an embodiment for simulating anomaly detection by a minute-based anomaly alert for a 1 year could be as follows: based on the last 30 days of historical time series values, $O((n-h)+h \times h)=(512,640-43,200)+43,200 \times 43,200=1,866,709,440$ operations, where n=1 year minutely=$356*24*60=512,640$, and where h=1 month minutely=$30*24*60=43,200$. In comparison, certain conventional anomaly detections would involve 956,709,273,600,000 operations (e.g., based on a complexity of $O(n \times h \times h)=512,640 \times 43,200 \times 43,200$).

For some embodiments, one or more user interfaces (e.g., one or more graphical user interfaces (GUIs)) are presented to enable a user to configure or review one or more anomaly detection configurations (e.g., anomaly alert monitor configurations) and preview (e.g., simulate) anomaly detection based on those one or more anomaly detection configurations. In this way, the user can preview of anomalies detected based on one or more anomaly detection settings, such as filtering based on attributes values.

As used herein, a rolling sum (e.g., a moving sum) can comprise a sum of data points calculated over a specified window in a time series of values. The window can "roll" or "move" through the time series, calculating a new sum for each shift. The size of the window can be determined by a given number of historical points being considered (e.g., the lookback parameter). For some embodiments, rolling sums are used as an internal state that allows the computation of the sliding window left matrix profile in a recursive manner.

As used herein, a metric can refer to a measurable parameter of a system, such as user visits to the system (e.g., new user visits, existing user visits), user requests from the system (e.g., page view requests), user submissions to the system (e.g., user intake requests, user uploads, or user postings), user session times with the system, and other user-related metrics relating to a system. In other instances, a metric can refer to a measurable parameter not relating to a system, such as revenue, customer visits, sales, orders, number of items sold, inventory numbers, and the like. A metric can be measured over a period of time (e.g., range of time) by taking, observing, or determining a series of measurement values of the metric at a series of time instances (e.g., series of timestamps). Various embodiments described herein use data that comprises time series data for a metric, which describes a time series of measurement values of the metric. As used herein, data (e.g., time series data) being monitored for anomalies can be updated periodically or in real-time. For various embodiments, time series data being monitored for anomalies is generated by a system or a device that is being monitored for anomalies (e.g., anomalies relating to performance issues, suspicious or unauthorized activities, and the like by the system or the device). As used herein, a time series can comprise a series (e.g., collection) of values (e.g., measurement values) observed for a metric (e.g., measurements of the metric made sequentially in time). Each individual value (e.g., data point) in a time series can have one or more attribute values (e.g., dimension values) associated with the individual value. For instance, with respect to time series data generated by a monitored system can include attribute values for such attributes as operating system type, device type, geographic location, data carrier (e.g., wireless carrier or Internet provider), and the like. As used herein, an attribute can be assigned an attribute value.

Use of various embodiments can provide an anomaly detection process for time series data that is computationally faster and more efficient than traditional method for detecting one or more anomalies in a time series of values, which can permit online or real-time anomaly detection or interactive simulation of anomaly detection (e.g., based on historical time series data). An anomaly detection process of some embodiments is capable of handling the ever increasing scale of time series data (e.g., large datasets that would render traditional anomaly detection processes too slow for use, such as for anomaly detection preview mode), and capable of better anomaly detection accuracy (e.g., capable of reducing false positives, false negatives, or both with respect to anomaly detection) than the traditional anomaly detection processes.

Various embodiments provide for a technical solution for anomaly detection technologies. For instance, various embodiments provide for a technical solution for improving anomaly detection (e.g., detection of value anomalies) in time series data by one or more hardware processors in comparison to conventional solutions for anomaly detection, where the improvements includes without limitation improvements with respect to the speed, accuracy, scalability (e.g., ability to maintain speed and accuracy even when the size of the time series datasets grows), or some combination thereof. Additionally, the improved anomaly detection of various embodiment can provide a technical solution for improved accuracy and speed when defining or previewing one or more configurations for anomaly alert monitoring, and a technical solution for improved the accuracy and speed in triggering anomaly alerts.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example data system 100 that includes an anomaly detection system with incomplete matrix profile-based anomaly detection 122 (hereafter, the anomaly detection system 122), according to various embodiments of the present disclosure. By including the anomaly detection system 122, the data system 100 can perform (e.g., simulate) anomaly detection on time series data (e.g., metric data from a monitored system) based on one or more incomplete matrix profiles, which can be used to configure an anomaly detection rule or configuration (e.g., for an alert monitoring). In particular, a user at the client device 102 can access the anomaly detection system 122

(e.g., via a graphical user interface presented on a software application on the client device 102) and use the anomaly detection system 122 to facilitate or cause performance (e.g., simulation) of detection one or more anomaly values in time series data (e.g., comprising a time series of measurement values of a metric) based on one or more incomplete matrix profiles.

Based on the anomaly detection system 122, the data system 100 can access select time series data that comprises a time series of values (e.g., measurement values for a metric) over a period of time. The time series data can be generated by a second system (e.g., monitored system or device) that is being monitored for anomalies (e.g., value anomalies). The select time series data can comprise historical time series data and/or can be received via a real-time data stream. The data system 100 can detect whether any value anomalies exist in the time series data by performing an anomaly detection process on the time series of values. The anomaly detection process can comprise generating a plurality of incomplete matrix profiles that correspond to a plurality of time series subsequences in the time series of values. The system can detect for any value anomalies in the time series of values based on the plurality of incomplete matrix profiles. Each incomplete matrix profile can comprise a left matrix profile for a corresponding time series subsequence, where the left matrix profile is generated based on distances determined between the corresponding time series subsequence and each time series subsequence that precedes the corresponding time series subsequence (e.g., to the left of the corresponding time series subsequence in the time series). The anomaly detection process can comprise logic that causes the anomaly detection process to avoid generating an individual incomplete matrix profile for an individual time series subsequence in response to determining that the individual time series subsequence does not fall within a historical lookback parameter. The historical lookback parameter can represent a number of previous time points that are considered when generating a select incomplete matrix profile for a select time series subsequence.

To determine an individual incomplete matrix profile, the data system 100 can determine a z-normalized Euclidean distance or a Euclidean distance for an individual time series subsequence that corresponds to the individual incomplete matrix profile. Additionally, the data system 100 can determine a plurality of rolling sums and a plurality of rolling squared sums for the time series of values, and determine an individual incomplete matrix profile by determining a z-normalized Euclidean distance for an individual time series subsequence based on the plurality of rolling sums and the plurality of rolling squared sums.

In response to detecting a set of value anomalies in the time series of values, the data system 100 can cause one or both of the following: an alert to be triggered relating to at least one value anomaly in the set of value anomalies; or generation of at least one visual indicator for at least one value anomaly in the set of value anomalies, where the visual indicator can be generated with respect to a graphical representation of at least a portion of the time series of values. For instance, the visual indicator can comprise a visual marker that indicates where, in the portion of the time series of values, the at least one value anomaly exists. For some embodiments, generating one or more visual indicator with respect to a graphical representation of at least a portion of the time series of values is useful for an interactive or an online simulation of anomaly detection, which may or may not be use in connection with configuring one or more anomaly alert monitors.

Based on the anomaly detection system 122, the data system 100 can determine whether any incomplete matrix profiles exceed an anomaly threshold value. In response to determining that an individual incomplete matrix profile exceeds the anomaly threshold value, the data system 100 can determine that an individual time series subsequence contains at least one value anomaly.

For various embodiments, the anomaly detection system 122 implements an anomaly detection process based on incomplete matrix profiles by way of a process similar to one detailed in the following Table 1.

TABLE 1

Input:
  T timeseries
  n: length of the timeseries
  m subsequence length
  h: historical lookback
  s: simulation points - such that n = s+h −1
Output:
  R: sliding window left matrix profile
begin
  // init matrix profile array
  for i = 1 to n do
    P[i] = ∞
  //optimization for computing A, B, Abar and Bbar with complexity of
  O(n)
  rollingSums = rollingSum(T, m)
  squaresRollingSums = squaresRollingSum(T, m)
  for k = 1 to n-h do
    // sliding window (historical simulation aware ) logic
    boolean inSimulationRange = k + m −1 <= h
    if not inSimulationRange then
      continue
    //using optimization to compute A, B, Abar, Bbar
    A = rollingSums[1]
    B = rollingSums[k]
    Abar = squaresRollingSums[1]
    Bbar = squaresRollingSums[k]
    C = product(T, 1 + k, m)
    dist = 2m * (1 − (C − (1/m) * AB) / sqrt((Abar − A*A/m) *
  (Bbar − B*B/m))
    // compute incomplete matrix profile (only compute the LEFT MP)
    if dist < P[k] then
      P[k] = dist
    for i = 2 to n − m + 1 −k do
      A = A − T[i−1] + T[i+m−1]
      B = B − T[i−1 + k] + T[i+m−1 + k]
      Abar = A − T[i−1]2 + T[i+m−1]2
      Bbar = A − T[i−1 + k] + T[i+m−1 + k]
      C = C − T[i−1] * T[i−1 + k] + T[i+m−1] * T[i+m−1 + k]
      dist = 2m * (1 − (C − (1/m) * AB) / sqrt((Abar − A*A/m) *
    (Bbar − B*B/m)))
      // compute incomplete matrix profile (only compute the
    LEFT MP)
      if dist < P[i+k] then
        P[i+k] = dist
    end for
  end for
  for i = 1 to n do
    P[i] = sqrt(P[i])
  // cut the historical lookback to get the simulated matrix profile scores
  // from the incomplete matrix profiles
  R = slice(P, h, n)
  return R
end
rollingSum(T, m): returns an array of m-points sum, where each sum is
calculated over a sliding window of length m across the elements at the
left in T
squaresRollingSum(T, m) returns rollingSum(TSquared, m) where
TSquared is an array of the values of T squared
product(T, offset, m) returns the sum from l=0 to m−1 of T[l+1] *
T[offset+l]

The process detailed in Table 1 initializing a matrix profile array with infinite values, which serve as initialization values for the matrix profile array. The process computes rolling sums and rolling squared sums of a time series of values using a sliding window of length m. The process iterates over time series subsequences of length m in the time series, and computes a left matrix profile for each time series subsequence using the rolling sums and rolling squared sums, where the (normalized) Euclidean distance for each time series subsequence is only computed if the time series subsequence is within a historical lookback window of length h (the sliding window). In particular, the left matrix profile for each time series subsequence is computed only if an index of the subsequence plus the length m minus 1 is less than or equal to the historical lookback h. Additionally, the left matrix profile is computed using a z-normalized Euclidean distance, where the left matrix profile is computed using sums A and B, squared sums Abar and Bbar, and a product C for the time series subsequence (specifically, the left matrix profile is computed with a distance comprising either the conventional Euclidean distance or the z-normalized Euclidean distance). For alternative embodiments, the process can be modified to use Euclidean distance in place of a z-normalized Euclidean distance. The process stores the left matrix profile for each time series subsequence in the matrix profile array. Simulated matrix profile scores are obtained from the matrix profile array by slicing the matrix profile array for s simulation points.

Thereafter, using the matrix profile array R, an anomaly (e.g., value anomaly) in the time series of values can be detected by identifying a time series subsequence with a left matrix profile that exceeds an anomaly threshold.

As shown, the data system 100 includes one or more client devices 102, a server system 108, and a network 106 (e.g., including Internet, wide-area-network (WAN), local-area-network (LAN), wireless network, etc.) that communicatively couples them together. Each client device 102 can host a number of applications, including a client software application 104. The client software application 104 can communicate data with the server system 108 via a network 106. Accordingly, the client software application 104 can communicate and exchange data with the server system 108 via the network 106.

The server system 108 provides server-side functionality via the network 106 to the client software application 104. While certain functions of the data system 100 are described herein as being performed by the anomaly detection system 122 on the server system 108, it will be appreciated that the location of certain functionality within the server system 108 is a design choice. For example, it may be technically preferable to initially deploy certain technology and functionality within the server system 108, but to later migrate this technology and functionality to the client software application 104 where the client device 102 performs methodologies described herein.

The server system 108 supports various services and operations that are provided to the client software application 104 by the anomaly detection system 122. Such operations include transmitting data from the anomaly detection system 122 to the client software application 104, receiving data from the client software application 104 to the anomaly detection system 122, and the anomaly detection system 122 processing data generated by the client software application 104. This data may include for example, requests and responses relating to anomaly detection, which can include requests/responses relating to simulating and exploring different anomaly detection configurations, such as for an anomaly alert monitor on metric data. Data exchanges within the data system 100 may be invoked and controlled through operations of software component environments available via one or more endpoints, or functions available via one or more user interfaces of the client software application 104, which may include web-based user interfaces provided by the server system 108 for presentation at the client device 102.

With respect to the server system 108, each of an Application Program Interface (API) server 110 and a web server 112 is coupled to an application server 116, which hosts the anomaly detection system 122. The application server 116 is communicatively coupled to a database server 118, which facilitates access to a database 120 that stores data associated with the application server 116, including data that may be generated or used by the anomaly detection system 122.

The API server 110 receives and transmits data (e.g., API calls, commands, requests, responses, and authentication data) between the client device 102 and the application server 116. Specifically, the API server 110 provides a set of interfaces (e.g., routines and protocols) that can be called or queried by the client software application 104 in order to invoke functionality of the application server 116. The API server 110 exposes various functions supported by the application server 116 including, without limitation: user registration; login functionality; data object operations (e.g., generating, storing, retrieving, encrypting, decrypting, transferring, access rights, licensing, etc.); and user communications.

Through one or more web-based interfaces (e.g., web-based user interfaces), the web server 112 can support various functionality of the anomaly detection system 122 of the application server 116. The application server 116 hosts a number of applications and subsystems, including the anomaly detection system 122, which supports various functions and services with respect to various embodiments described herein.

The application server 116 is communicatively coupled to a database server 118, which facilitates access to database(s) 120 in which may be stored data associated with the anomaly detection system 122. Data associated with the anomaly detection system 122 can include, for example, data that comprises a time series of values, such as measurement values for a metric (e.g., with a set of attribute values associated with each of the measurement values in the time series).

Figure 2:
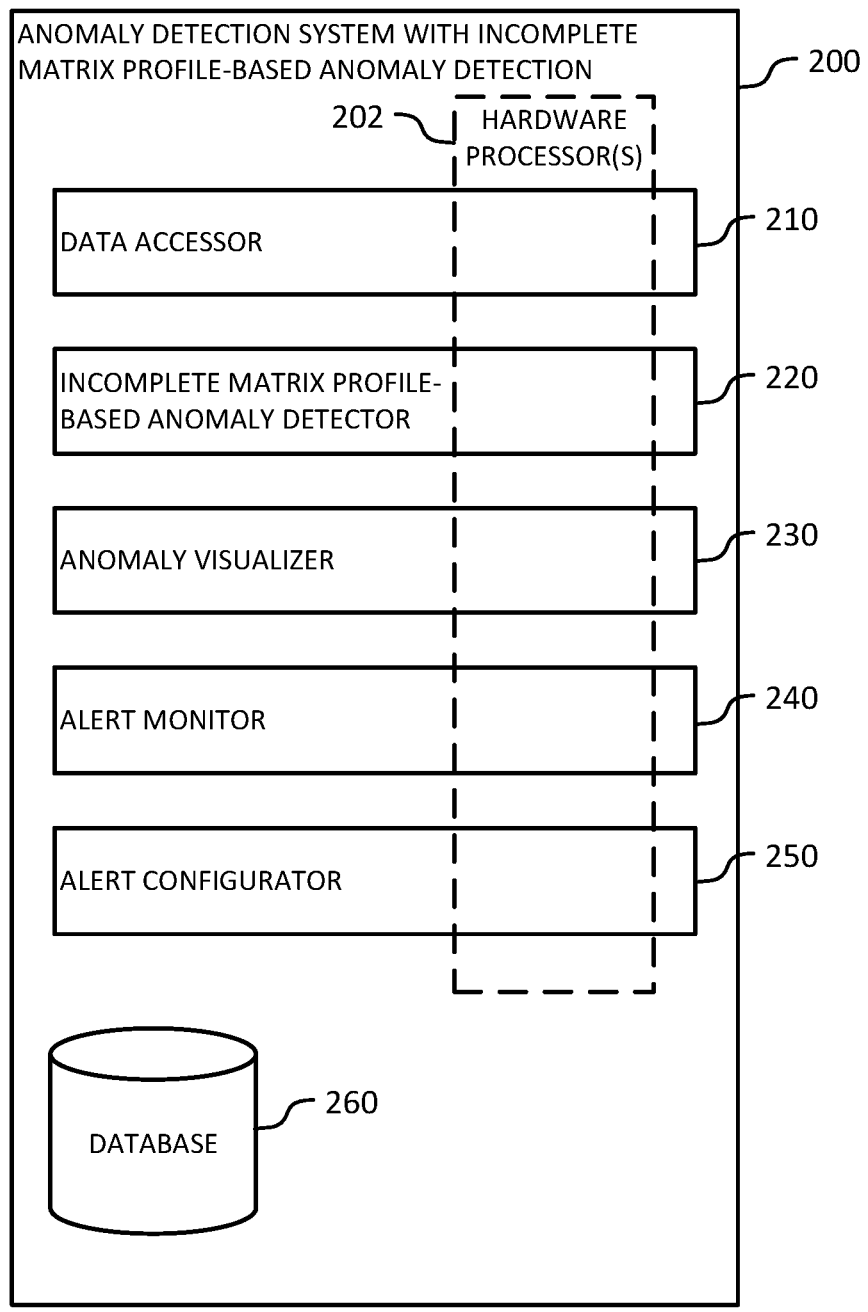
FIG. 2 is a block diagram illustrating an example anomaly detection system with incomplete matrix profile-based anomaly detection, according to various embodiments of the present disclosure.

FIG. 2 is a block diagram illustrating an example anomaly detection system with incomplete matrix profile-based anomaly detection 200 (hereafter, the anomaly detection system 200), according to various embodiments of the present disclosure. For some embodiments, the anomaly detection system 200 represents an example of the anomaly detection system 122 described with respect to FIG. 1. As shown, the anomaly detection system 200 comprises a data accessor 210, an incomplete matrix profile-based anomaly detector 220, an anomaly visualizer 230, an alert monitor 240, an alert configurator 250, a database 260. According to various embodiments, one or more of the data accessor 210, the incomplete matrix profile-based anomaly detector 220, the anomaly visualizer 230, the alert monitor 240, and the alert configurator 250 are implemented by one or more hardware processors 202. Data (e.g., alert monitor configuration information, information regarding detected anomalies, etc.) generated by, or used by, one or more of the data accessor 210, the incomplete matrix profile-based anomaly detector 220, the anomaly visualizer 230, the alert monitor 240, and the alert configurator 250 is stored on the database (or datastore) 260 of anomaly detection system 200.

The data accessor 210 is configured to facilitate access of time series data that comprises a time series of values, such as measurement values for a metric (e.g., user page views, user session time, system latency, user requests, or another measurement), over a period of time (e.g., range of dates, range of times, or both). The metric can relate to measuring a user interaction or activity with respect to another system (e.g., third-party system) that is targeted for monitoring and analysis. For some embodiments, the time series data being accessed is historical time series, or time series data that being monitored and analyzed (e.g., in real-time or periodically) for anomaly detection. The time series data can be generated by another system (e.g., a third-party system) that is targeted for monitoring and analysis. For some embodiments, a data source provides event data, and at least some portion of the event data is transformed into time series data. Depending on the embodiment, the portion of event data can be transformed using an aggregation function (such as summation function or average function, which can be selected by a user), can be performed at a specific granularity (which can be specified by a user), and can be performed while applying attribute filters (which can be specified by a user). Additionally, for some embodiments, the time series further comprises a set of attribute values associated with each measurement value (e.g., text value, numeric value, or alphanumeric value) in the time series, such as a value describing an operating system type, a mobile device type, an Internet service provider (ISP), a country, a region, a state, or any other value associated with (e.g., describing a circumstance associated with) a measurement value in the time series.

The incomplete matrix profile-based anomaly detector 220 is configured to facilitate performance of anomaly detection based on one or more incomplete matrix profiles as described herein. For instance, the incomplete matrix profile-based anomaly detector 220 can detect whether any value anomalies exist in the time series data by generating a plurality of incomplete matrix profiles that correspond to a plurality of time series subsequences in the time series of values. The incomplete matrix profile-based anomaly detector 220 can detect for any value anomalies in the time series of values based on the plurality of incomplete matrix profiles. For some embodiments, generating one or more visual indicator with respect to a graphical representation of at least a portion of the time series of values is useful for an interactive or an online simulation of anomaly detection, which may or may not be use in connection with configuring one or more anomaly alert monitors (e.g., by the alert configurator 250).

The anomaly visualizer 230 is configured to facilitate generation of at least one visual indicator for at least one value anomaly in the set of value anomalies in response to detecting a set of value anomalies in the time series of values (by the incomplete matrix profile-based anomaly detector 220). For some embodiments, generating one or more visual indicator with respect to a graphical representation of at least a portion of the time series of values is useful for an interactive or an online simulation of anomaly detection, which may or may not be use in connection with configuring one or more anomaly alert monitors.

The alert monitor 240 is configured to facilitate causing an alert to be triggered, based on the new anomaly alert monitor in response to detecting a set of value anomalies in the time series of values (by the incomplete matrix profile-based anomaly detector 220). For various embodiments, once an anomaly alert monitor is enabled, the incomplete matrix profile-based anomaly detector 220 can be used to monitor the time series data for anomalies (e.g., value anomalies) in new values of the time series.

The alert configurator 250 is configured to facilitate configuration of a new anomaly alert monitor. For various embodiments, the anomaly alert monitor is configured to monitor the time series data for anomaly (e.g., value anomaly) detection based on values (e.g., measurement values) in the time series. Once configured by the alert configurator 250, an alert monitor (e.g., configuration information for the alert monitor) can be stored on the anomaly detection system 200 (e.g., on the database 260), and can be enabled or disabled (e.g., by a user) as desired.

Figure 3:
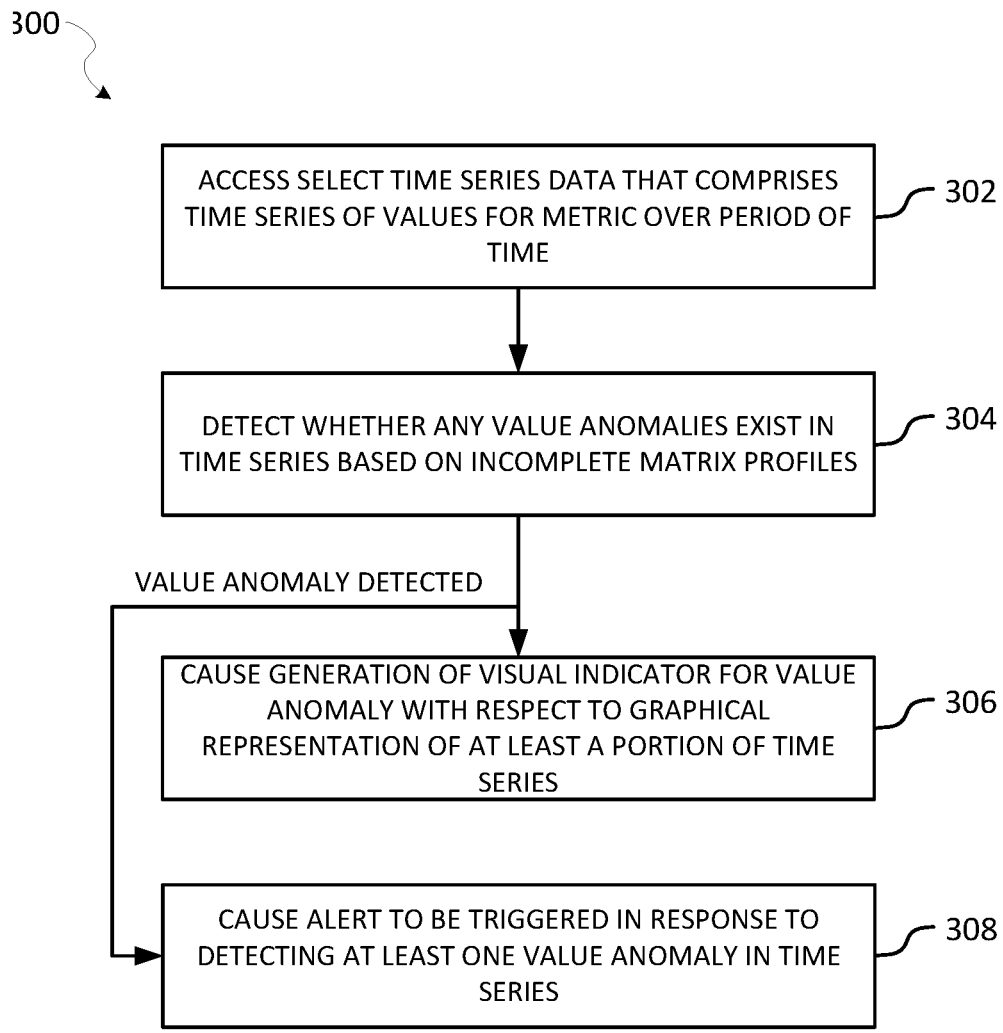
FIGS. 3 and 4 are flowcharts illustrating example methods for anomaly detection based on one or more incomplete matrix profiles, according to various embodiments of the present disclosure.
Figure 4:
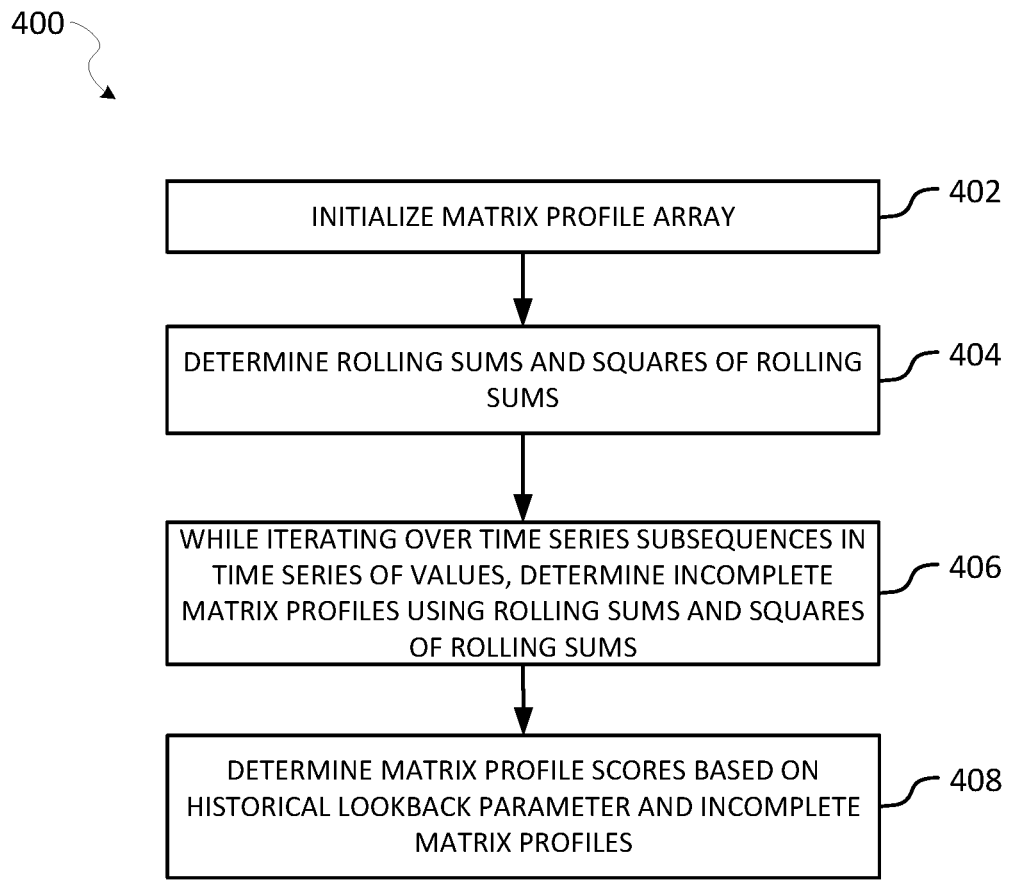

FIGS. 3 and 4 are flowcharts illustrating example methods 300, 400 for anomaly detection based on one or more incomplete matrix profiles, according to various embodiments of the present disclosure. It will be understood that example methods described herein may be performed by a machine in accordance with some embodiments. For example, the methods 300 can be performed by the anomaly detection system 122 described with respect to FIG. 1, the anomaly detection system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of the method 300 may be represented by executable instructions that, when executed by a processor of a computing device, cause the computing device to perform the method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Referring now to FIG. 3, at operation 302, select time series data is accessed (e.g., from one of the databases 120) by a hardware processor, where the select time series data comprises a time series of values (e.g., measurement values for a metric) over a period of time. For some embodiments, the select time series data is generated by a system that is being monitored for anomalies. For instance, the select time series data can comprise a time series of measurement values for a metric (e.g., page views of a website) over a period of time, and where the time series comprises a set of attribute values (e.g., for a country attribute, a city attribute, an ISP attribute, a device type attribute, a user gender attribute, an operating system attribute, and the like) associated with each measurement value in the time series. For various embodiments, each measurement value in the time series represents a data point in the time series. Additionally, for some metrics, each measurement value in the time series can be regarded as a count for the metric. For instance, where the metric is page views (or a similar metric), each data point in the time series (e.g., each measurement value) can represent one page view. For some embodiments, the time series data is generated from event data, where at least some portion of event data is transformed into the time series data. Depending on the embodiment, the portion of event data can be transformed using an aggregation function (such as summation function or average function, which can be selected by a user), can be performed at a specific granularity (which can be specified by a user), and can be performed while applying attribute filters (which can be specified by a user).

At operation 304, the hardware processor detects whether any value anomalies exist in the time series data of measurement values. For some embodiments, operation 304 comprises performing an anomaly detection process on the time series of measurement values. Additionally, for some embodiments, the anomaly detection process comprises generating a plurality of incomplete matrix profiles that corresponds to a plurality of time series subsequences in the time series of measurement values, and detecting for any value anomalies in the time series of measurement values based on the plurality of incomplete matrix profiles. For instance, an individual incomplete matrix profile of the plurality of incomplete matrix profiles can be determined by determining a Euclidean distance value or a z-normalized Euclidean distance value for an individual time series subsequence of the plurality of time series subsequences that corresponds to the individual incomplete matrix profile. For example, the plurality of incomplete matrix profiles can be generated by determining (e.g., calculating) a plurality of rolling sums for the time series of measurement values, and determining (e.g., calculating) a plurality of rolling squared sums for the time series of measurement values. Subsequently, an individual incomplete matrix profile of the plurality of incomplete matrix profiles can be determined by using the plurality of rolling sums and the plurality of rolling squared sums to determine a z-normalized Euclidean distance for an individual time series subsequence (of the plurality of time series subsequences) that corresponds to the individual incomplete matrix profile.

For various embodiments, each incomplete matrix profile (in the plurality of incomplete matrix profiles) comprises a left matrix profile for a corresponding time series subsequence of the plurality of time series subsequences, where the left matrix profile is generated based on distances determined between the corresponding time series subsequence and each time series subsequence in the time series of measurement values that precede (e.g., the left of) the corresponding time series subsequence. To detect for any value anomalies in the time series of measurement values based on the plurality of incomplete matrix profiles, the hardware processor can determine whether any incomplete matrix profiles of the plurality of incomplete matrix profiles exceed an anomaly threshold value. In response to determining that an individual incomplete matrix profile of the plurality of incomplete matrix profiles exceeds the anomaly threshold value, the hardware process can determine that an individual time series subsequence of the plurality of time series subsequences contains at least one value anomaly.

For some embodiments, the anomaly detection process comprises logic (e.g., simulation aware logic) that causes the anomaly detection process to avoid (e.g., skip) generating an individual incomplete matrix profile of the plurality of incomplete matrix profiles for an individual time series subsequence of the plurality of time series subsequences in response to determining that the individual time series subsequence does not fall within a historical lookback parameter (e.g., h). For various embodiments, the historical lookback parameter represents a number of previous time points that are considered when generating a select incomplete matrix profile of the plurality of incomplete matrix profiles for a select time series subsequence of the plurality of time series subsequences.

In response detecting (by operation 304) a set of value anomalies in the time series of measurement values, the method 300 can proceed to operation 306, operation 308, or both. At operation 306, the hardware processor causes an alert to be triggered, where the alert relates to at least one value anomaly in the set of value anomalies. At operation 308, the hardware processor causes generation of at least one visual indicator for at least one value anomaly in the set of value anomalies, where the visual indicator is generated with respect to a graphical representation of at least a portion of the time series of measurement values. For some embodiments, the graphical representation is presented to a user through one or more graphical user interfaces (GUIs), such as through a web-based portal. The graphical user interfaces can be associated with reviewing or configuring settings of an anomaly alert monitor, and previewing the results of the anomaly alert monitor based on the settings.

Referring now to FIG. 4, the method 400 represents an example implementation of an anomaly detection process, which can be performed as part of operation 304 of the method 300 of FIG. 3. At operation 402, a hardware processor initializes a matrix profile array (e.g., with infinite values). Thereafter, at operation 404, the hardware processor determines (e.g., calculates) rolling sums and squares of rolling sums. For operation 404, the rolling sums and the squares of rolling sums are computed for a time series of values based on the length (e.g., m) of each time series subsequence. Based on the rolling sums and the squares of rolling sums, at operation 406, the hardware processor iterates over the time series subsequences in the time series and determines (e.g., generates or computes) incomplete matrix profiles (e.g., sliding window left matrix profile) for the time series. Subsequently, at operation 408, the hardware processor determines matrix profile scores based a historical lookback parameter (e.g., h) and based on the incomplete matrix profiles determined by operation 406.

Figure 5:
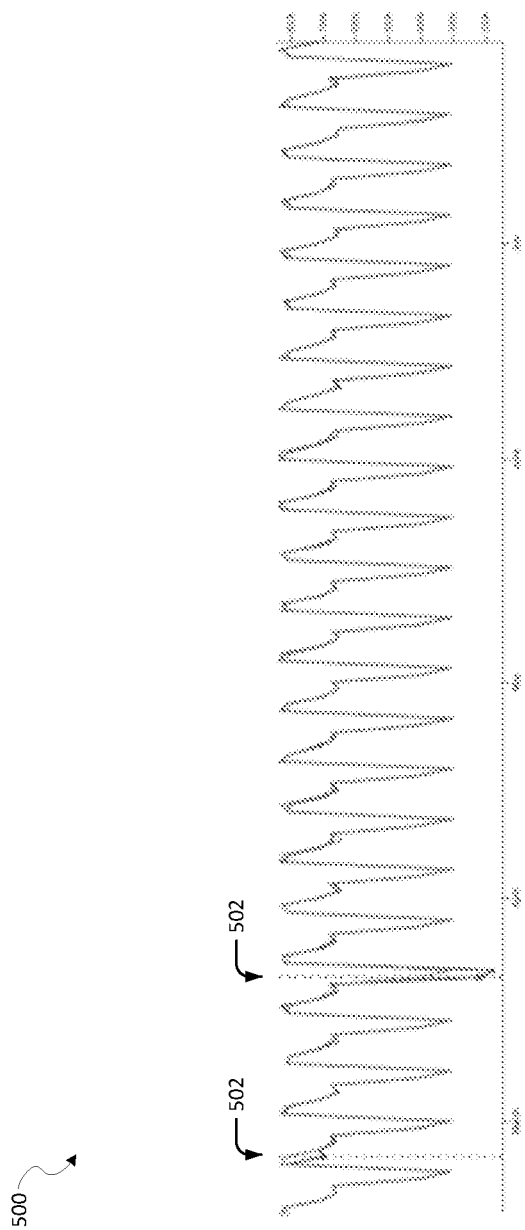
FIG. 5 is an example a graphical representation of a portion of a time series of values that includes visual indicators, according to some example embodiments.

FIG. 5 is an example a graphical representation 500 of a portion of a time series of values that includes visual indicators 502, according to various embodiments of the present disclosure. According to various embodiments, the graphical representation 500 can be one that is displayed to a user through a graphical user interface when the user is simulating anomaly detection (e.g., detecting anomalies in real-time web page daily pageviews based on historical data) based one or more anomaly detection settings. For example, the graphical representation 500 can be presented to a user through a graphical user interface used by the user to review or configure one or more settings for an anomaly alert monitor, and to preview (e.g., simulate) an anomaly detection process for the anomaly alert monitor based on the one or more settings. For some embodiments, the visual indicators 502 are generated and displayed over different time points of the time series of values where an anomaly (e.g., value anomaly) is detected by an anomaly detection process based on one or more incomplete matrix profiles.

Figure 6:
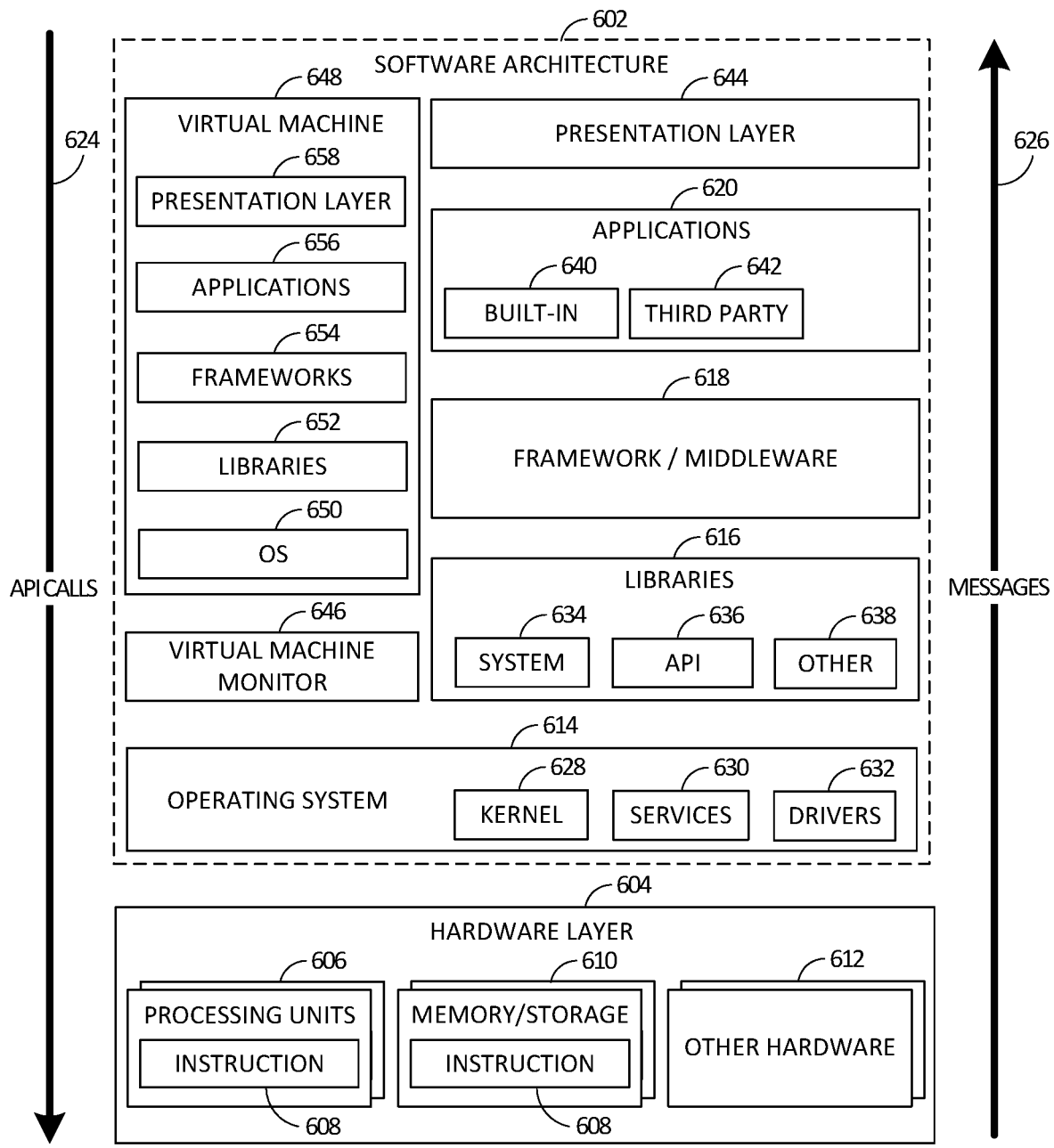
FIG. 6 is a block diagram illustrating a representative software architecture, which may be used in conjunction with various hardware architectures herein described, according to various embodiments of the present disclosure.
Figure 7:
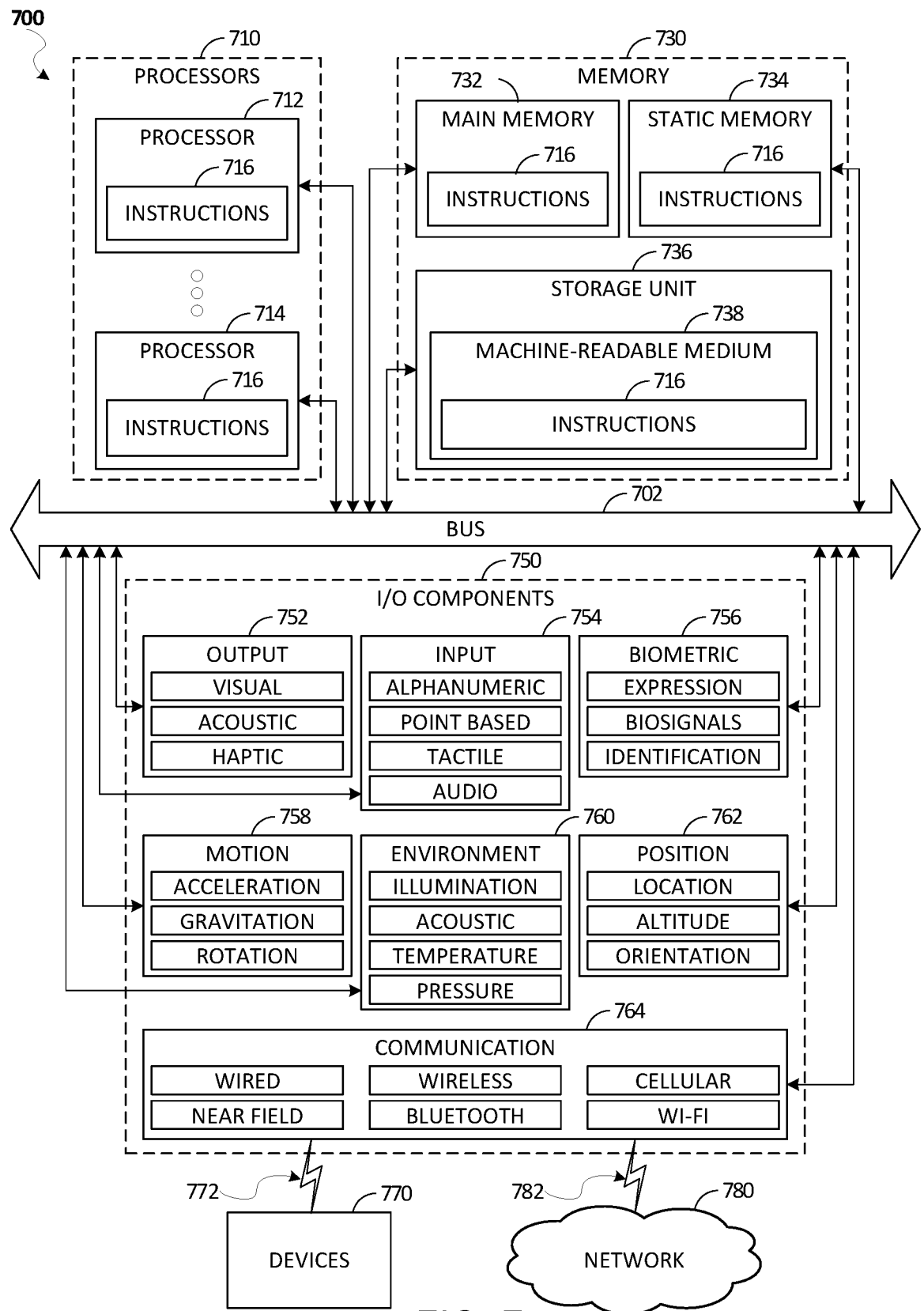
FIG. 7 is a block diagram illustrating components of a machine able to read instructions from a machine storage medium and perform any one or more of the methodologies discussed herein according to various embodiments of the present disclosure.

Various embodiments described herein may be implemented by way of the example software architecture illustrated by and described with respect to FIG. 6 or by way of the example machine illustrated by and described with respect to FIG. 7.

FIG. 6 is a block diagram illustrating an example of a software architecture 602 that may be installed on a machine, according to some example embodiments. FIG. 6 is merely a non-limiting example of a software architecture, and it will be appreciated that many other architectures may be implemented to facilitate the functionality described herein. The software architecture 602 may be executing on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 comprises one or more processing units 606 having associated executable instructions 608. The executable instructions 608 represent the executable instructions of the software architecture 602. The hardware layer 604 also includes memory or storage modules 610, which also have the executable instructions 608. The hardware layer 604 may also comprise other hardware 612, which represents any other hardware of the hardware layer 604, such as the other hardware illustrated as part of the machine 700.

In the example architecture of FIG. 6, the software architecture 602 may be conceptualized as a stack of layers, where each layer provides particular functionality. For example, the software architecture 602 may include layers such as an operating system 614, libraries 616, frameworks/middleware 618, applications 620, and a presentation layer 644. Operationally, the applications 620 or other components within the layers may invoke API calls 624 through the software stack and receive a response, returned values, and so forth (illustrated as messages 626) in response to the API calls 624. The layers illustrated are representative in nature, and not all software architectures have all layers. For example, some mobile or special-purpose operating systems may not provide a frameworks/middleware 618 layer, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than by interfacing directly with the underlying operating system 614 functionality (e.g., kernel 628, services 630, or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks/middleware 618 (also sometimes referred to as middleware) may provide a higher-level common infrastructure that may be utilized by the applications 620 or other software components/modules. For example, the frameworks/middleware 618 may provide various graphical user interface functions, high-level resource management, high-level location services, and so forth. The frameworks/middleware 618 may provide a broad spectrum of other APIs that may be utilized by the applications 620 and/or other software components/modules, some of which may be specific to a particular operating system or platform.

The applications 620 include built-in applications 640 and/or third-party applications 642. Examples of representative built-in applications 640 may include, but are not limited to, a home application, a contacts application, a browser application, a book reader application, a location application, a media application, a messaging application, or a game application.

The third-party applications 642 may include any of the built-in applications 640, as well as a broad assortment of other applications. In a specific example, the third-party applications 642 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 642 may invoke the API calls 624 provided by the mobile operating system such as the operating system 614 to facilitate functionality described herein.

The applications 620 may utilize built-in operating system functions (e.g., kernel 628, services 630, or drivers 632), libraries (e.g., system libraries 634, API libraries 636, and other libraries 638), or frameworks/middleware 618 to create user interfaces to interact with users of the system. Alternatively, or additionally, in some systems, interactions with a user may occur through a presentation layer, such as the presentation layer 644. In these systems, the application/module "logic" can be separated from the aspects of the application/module that interact with the user.

Some software architectures utilize virtual machines. In the example of FIG. 6, this is illustrated by a virtual machine 648. The virtual machine 648 creates a software environment where applications/modules can execute as if they were executing on a hardware machine (e.g., the machine 700 of FIG. 7). The virtual machine 648 is hosted by a host operating system (e.g., the operating system 614) and typically, although not always, has a virtual machine monitor 646, which manages the operation of the virtual machine 648 as well as the interface with the host operating system (e.g., the operating system 614). A software architecture executes within the virtual machine 648, such as an operating system 650, libraries 652, frameworks/middleware 654, applications 656, or a presentation layer 658. These layers of software architecture executing within the virtual machine 648 can be the same as corresponding layers previously described or may be different.

FIG. 7 illustrates a diagrammatic representation of a machine 700 in the form of a computer system within which a set of instructions may be executed for causing the machine 700 to perform any one or more of the methodologies discussed herein, according to an embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the method 400 described above with respect to FIG. 4. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an embodiment, the processors 710 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions contemporaneously. Although FIG. 7 shows multiple processors 710, the machine 700 may include a single processor with a single core, a single processor with multiple cores (e.g., a multi-core processor), multiple processors with a single core, multiple processors with multiples cores, or any combination thereof.

The memory 730 may include a main memory 732, a static memory 734, and a storage unit 736 including machine-readable medium 738, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 750 may include biometric components 756, motion components 758, environmental components 760, or position components 762, among a wide array of other components. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 700 including processors 710), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 700, but deployed across a number of machines 700. In some example embodiments, the processors 710 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 730, 732, 734, and/or the memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 780 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

EXAMPLES

Described implementations of the subject matter can include one or more features, alone or in combination as illustrated below by way of examples.

Example 1 is a system comprising: a memory storing instructions; and one or more hardware processors communicatively coupled to the memory and configured by the instructions to perform operations comprising: accessing select time series data that comprises a time series of measurement values for a metric over a period of time, the system being a first system, and the select time series data being generated by a second system that is being monitored for anomalies; detecting whether any value anomalies exist in the time series data of measurement values by performing an anomaly detection process on the time series of measurement values, the anomaly detection process comprising: generating a plurality of incomplete matrix profiles that corresponds to a plurality of time series subsequences in the time series of measurement values; and detecting for any value anomalies in the time series of measurement values based on the plurality of incomplete matrix profiles; and in response to detecting a set of value anomalies in the time series of measurement values, at least one of: causing an alert to be triggered, the alert relating to at least one value anomaly in the set of value anomalies; or causing generation of at least one visual indicator for at least one value anomaly in the set of value anomalies, the visual indicator being generated with respect to a graphical representation of at least a portion of the time series of measurement values.

In Example 2, the subject matter of Example 1 includes, wherein each incomplete matrix profile in the plurality of incomplete matrix profiles comprises a left matrix profile for a corresponding time series subsequence of the plurality of time series subsequences, the left matrix profile being generated based on distances determined between the corresponding time series subsequence and each time series subsequence in the time series of measurement values that precede the corresponding time series subsequence.

In Example 3, the subject matter of Examples 1-2 includes, wherein the detecting for any value anomalies in the time series of measurement values based on the plurality of incomplete matrix profiles comprises: determining whether any incomplete matrix profiles of the plurality of incomplete matrix profiles exceed an anomaly threshold value; and in response to determining that an individual incomplete matrix profile of the plurality of incomplete matrix profiles exceeds the anomaly threshold value, determining that an individual time series subsequence of the plurality of time series subsequences contains at least one value anomaly.

In Example 4, the subject matter of Examples 1-3 includes, wherein the anomaly detection process comprises logic that causes the anomaly detection process to avoid generating an individual incomplete matrix profile of the plurality of incomplete matrix profiles for an individual time series subsequence of the plurality of time series subsequences in response to determining that the individual time series subsequence does not fall within a historical lookback parameter, and wherein the historical lookback parameter represents a number of previous time points that are considered when generating a select incomplete matrix profile of the plurality of incomplete matrix profiles for a select time series subsequence of the plurality of time series subsequences.

In Example 5, the subject matter of Examples 1-4 includes, wherein the generating of the plurality of incomplete matrix profiles comprises: determining an individual incomplete matrix profile of the plurality of incomplete matrix profiles by determining a z-normalized Euclidean distance for an individual time series subsequence of the plurality of time series subsequences that corresponds to the individual incomplete matrix profile.

In Example 6, the subject matter of Examples 1-5 includes, wherein the generating of the plurality of incomplete matrix profiles comprises: determining a plurality of rolling sums for the time series of measurement values; determining a plurality of rolling squared sums for the time series of measurement values; and determining an individual incomplete matrix profile of the plurality of incomplete matrix profiles by determining a z-normalized Euclidean distance for an individual time series subsequence of the plurality of time series subsequences that corresponds to the individual incomplete matrix profile based on the plurality of rolling sums and the plurality of rolling squared sums.

In Example 7, the subject matter of Examples 1-6 includes, wherein the generating of the plurality of incomplete matrix profiles comprises: determining an individual incomplete matrix profile of the plurality of incomplete matrix profiles by determining a Euclidean distance for an individual time series subsequence of the plurality of time series subsequences that corresponds to the individual incomplete matrix profile.

In Example 8, the subject matter of Examples 1-7 includes, wherein the select time series data is historical time series data.

In Example 9, the subject matter of Examples 1-8 includes, wherein the select time series data is received via a real-time data stream.

Example 10 is a non-transitory computer-readable medium comprising instructions that, when executed by a hardware processor of a device, cause the device to perform operations to implement any of Examples 1-9.

Example 11 is a method to implement any of Examples 1-9.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A system comprising:
a memory storing instructions; and
one or more hardware processors communicatively coupled to the memory and configured by the instructions to perform operations comprising:
accessing select time series data that comprises a time series of measurement values for a metric over a period of time, the system being a first system, and the select time series data being generated by a second system that is being monitored for anomalies;
detecting whether any value anomalies exist in the time series data of measurement values by performing an anomaly detection process on the time series of measurement values, the anomaly detection process comprising:
generating a plurality of incomplete matrix profiles that corresponds to a plurality of time series subsequences in the time series of measurement values, the anomaly detection process comprising logic that causes the anomaly detection process to avoid generating an individual incomplete matrix profile of the plurality of incomplete matrix profiles for an individual time series subsequence of the plurality of time series subsequences in response to determining that the individual time series subsequence does not fall within a historical lookback parameter, the avoiding generating of the individual incomplete matrix profile comprises skipping computation of distance measures for the individual time series subsequence and continuing to a next time series subsequence of the plurality of incomplete matrix profiles, the historical lookback parameter representing a number of previous time points that are considered when generating a select incomplete matrix profile of the plurality of incomplete matrix profiles for a select time series subsequence of the plurality of time series subsequences; and
detecting for any value anomalies in the time series of measurement values based on the plurality of incomplete matrix profiles; and in response to detecting a set of value anomalies in the time series of measurement values, at least one of:
    causing an alert to be triggered, the alert relating to at least one value anomaly in the set of value anomalies; or
    causing generation of at least one visual indicator for at least one value anomaly in the set of value anomalies, the visual indicator being generated with respect to a graphical representation of at least a portion of the time series of measurement values.

2. The system of claim 1, wherein each incomplete matrix profile in the plurality of incomplete matrix profiles comprises a left matrix profile for a corresponding time series subsequence of the plurality of time series subsequences, the left matrix profile being generated based on distances determined between the corresponding time series subsequence and each time series subsequence in the time series of measurement values that precede the corresponding time series subsequence.

3. The system of claim 1, wherein the detecting for any value anomalies in the time series of measurement values based on the plurality of incomplete matrix profiles comprises:
    determining whether any incomplete matrix profiles of the plurality of incomplete matrix profiles exceed an anomaly threshold value; and
    in response to determining that an individual incomplete matrix profile of the plurality of incomplete matrix profiles exceeds the anomaly threshold value, determining that an individual time series subsequence of the plurality of time series subsequences contains at least one value anomaly.

4. The system of claim 1, wherein the generating of the plurality of incomplete matrix profiles comprises:
    determining an individual incomplete matrix profile of the plurality of incomplete matrix profiles by determining a z-normalized Euclidean distance for an individual time series subsequence of the plurality of time series subsequences that corresponds to the individual incomplete matrix profile.

5. The system of claim 1, wherein the generating of the plurality of incomplete matrix profiles comprises:
    determining a plurality of rolling sums for the time series of measurement values;
    determining a plurality of rolling squared sums for the time series of measurement values; and
    determining an individual incomplete matrix profile of the plurality of incomplete matrix profiles by determining a z-normalized Euclidean distance for an individual time series subsequence of the plurality of time series subsequences that corresponds to the individual incomplete matrix profile based on the plurality of rolling sums and the plurality of rolling squared sums.

6. The system of claim 1, wherein the generating of the plurality of incomplete matrix profiles comprises:
    determining an individual incomplete matrix profile of the plurality of incomplete matrix profiles by determining a Euclidean distance for an individual time series subsequence of the plurality of time series subsequences that corresponds to the individual incomplete matrix profile.

7. The system of claim 1, wherein the select time series data is historical time series data.

8. The system of claim 1, wherein the select time series data is received via a real-time data stream.

9. A non-transitory computer-readable medium comprising instructions that, when executed by a hardware processor of a device, cause the device to perform operations comprising:
    accessing select time series data that comprises a time series of measurement values for a metric over a period of time, the select time series data being generated by a system that is being monitored for anomalies;
    detecting whether any value anomalies exist in the time series data of measurement values by performing an anomaly detection process on the time series of measurement values, the anomaly detection process comprising:
        generating a plurality of incomplete matrix profiles that corresponds to a plurality of time series subsequences in the time series of measurement values, the anomaly detection process comprising logic that causes the anomaly detection process to avoid generating an individual incomplete matrix profile of the plurality of incomplete matrix profiles for an individual time series subsequence of the plurality of time series subsequences in response to determining that the individual time series subsequence does not fall within a historical lookback parameter, the avoiding generating of the individual incomplete matrix profile comprises skipping computation of distance measures for the individual time series subsequence and continuing to a next time series subsequence of the plurality of incomplete matrix profiles, the historical lookback parameter representing a number of previous time points that are considered when generating a select incomplete matrix profile of the plurality of incomplete matrix profiles for a select time series subsequence of the plurality of time series subsequences; and
        detecting for any value anomalies in the time series of measurement values based on the plurality of incomplete matrix profiles; and
    in response to detecting a set of value anomalies in the time series of measurement values, at least one of:
        causing an alert to be triggered, the alert relating to at least one value anomaly in the set of value anomalies; or
        causing generation of at least one visual indicator for at least one value anomaly in the set of value anomalies, the visual indicator being generated with respect to a graphical representation of at least a portion of the time series of measurement values.

10. The non-transitory computer-readable medium of claim 9, wherein each incomplete matrix profile in the plurality of incomplete matrix profiles comprises a left matrix profile for a corresponding time series subsequence of the plurality of time series subsequences, the left matrix profile being generated based on distances determined between the corresponding time series subsequence and each time series subsequence in the time series of measurement values that precede the corresponding time series subsequence.

11. The non-transitory computer-readable medium of claim 9, wherein the detecting for any value anomalies in the select time series data based on the plurality of incomplete matrix profiles comprises:
    determining whether any incomplete matrix profiles of the plurality of incomplete matrix profiles exceed an anomaly threshold value; and
    in response to determining that an individual incomplete matrix profile of the plurality of incomplete matrix profiles exceeds the anomaly threshold value, determining that an individual time series subsequence of the plurality of time series subsequences contains at least one value anomaly.

12. The non-transitory computer-readable medium of claim 9, wherein the generating of the plurality of incomplete matrix profiles comprises:
determining an individual incomplete matrix profile of the plurality of incomplete matrix profiles by determining a z-normalized Euclidean distance for an individual time series subsequence of the plurality of time series subsequences that corresponds to the individual incomplete matrix profile.

13. The non-transitory computer-readable medium of claim 9, wherein the generating of the plurality of incomplete matrix profiles comprises:
determining a plurality of rolling sums for the time series of measurement values;
determining a plurality of rolling squared sums for the time series of measurement values; and
determining an individual incomplete matrix profile of the plurality of incomplete matrix profiles by determining a z-normalized Euclidean distance for an individual time series subsequence of the plurality of time series subsequences that corresponds to the individual incomplete matrix profile based on the plurality of rolling sums and the plurality of rolling squared sums.

14. The non-transitory computer-readable medium of claim 9, wherein the generating of the plurality of incomplete matrix profiles comprises:
determining an individual incomplete matrix profile of the plurality of incomplete matrix profiles by determining a Euclidean distance for an individual time series subsequence of the plurality of time series subsequences that corresponds to the individual incomplete matrix profile.

15. The non-transitory computer-readable medium of claim 9, wherein the select time series data is historical time series data.

16. The non-transitory computer-readable medium of claim 9, wherein the select time series data is received via a real-time data stream.

17. A method comprising:
accessing, by one or more hardware processors, select time series data that comprises a time series of measurement values for a metric over a period of time, the select time series data being generated by a system that is being monitored for anomalies;
detecting, by the one or more hardware processors, whether any value anomalies exist in the time series data of measurement values by performing an anomaly detection process on the time series of measurement values, the anomaly detection process comprising:
generating a plurality of incomplete matrix profiles that corresponds to a plurality of time series subsequences in the time series of measurement values, the anomaly detection process comprising logic that causes the anomaly detection process to avoid generating an individual incomplete matrix profile of the plurality of incomplete matrix profiles for an individual time series subsequence of the plurality of time series subsequences in response to determining that the individual time series subsequence does not fall within a historical lookback parameter, the avoiding generating of the individual incomplete matrix profile comprises skipping computation of distance measures for the individual time series subsequence and continuing to a next time series subsequence of the plurality of incomplete matrix profiles, the historical lookback parameter representing a number of previous time points that are considered when generating a select incomplete matrix profile of the plurality of incomplete matrix profiles for a select time series subsequence of the plurality of time series subsequences; and
detecting for any value anomalies in the time series of measurement values based on the plurality of incomplete matrix profiles; and
in response to detecting a set of value anomalies in the time series of measurement values, at least one of:
causing, by the one or more hardware processors, an alert to be triggered, the alert relating to at least one value anomaly in the set of value anomalies; or
causing generation of at least one visual indicator for at least one value anomaly in the set of value anomalies, the visual indicator being generated with respect to a graphical representation of at least a portion of the time series of measurement values.

18. The method of claim 17, wherein each incomplete matrix profile in the plurality of incomplete matrix profiles comprises a left matrix profile for a corresponding time series subsequence of the plurality of time series subsequences, the left matrix profile being generated based on distances determined between the corresponding time series subsequence and each time series subsequence in the time series of measurement values that precede the corresponding time series subsequence.

19. The method of claim 17, wherein the generating of the plurality of incomplete matrix profiles comprises:
determining an individual incomplete matrix profile of the plurality of incomplete matrix profiles by determining a z-normalized Euclidean distance for an individual time series subsequence of the plurality of time series subsequences that corresponds to the individual incomplete matrix profile.

20. The method of claim 17, wherein the generating of the plurality of incomplete matrix profiles comprises:
determining a plurality of rolling sums for the time series of measurement values;
determining a plurality of rolling squared sums for the time series of measurement values; and
determining an individual incomplete matrix profile of the plurality of incomplete matrix profiles by determining a z-normalized Euclidean distance for an individual time series subsequence of the plurality of time series subsequences that corresponds to the individual incomplete matrix profile based on the plurality of rolling sums and the plurality of rolling squared sums.

* * * * *